United States Patent [19]
Isnardi et al.

[11] Patent Number: 6,037,984
[45] Date of Patent: Mar. 14, 2000

[54] METHOD AND APPARATUS FOR EMBEDDING A WATERMARK INTO A DIGITAL IMAGE OR IMAGE SEQUENCE

[75] Inventors: Michael Anthony Isnardi, Plainsboro, N.J.; Clyde Musgrave, Royersford, Pa.

[73] Assignee: Sarnoff Corporation, Princeton, N.J.

[21] Appl. No.: 08/997,965

[22] Filed: Dec. 24, 1997

[51] Int. Cl.[7] ...................................................... H04N 7/08
[52] U.S. Cl. ........................... 348/403; 348/473; 380/10; 380/49
[58] Field of Search ................................... 348/403, 408, 348/473; 380/5, 10, 23, 49, 54; H04N 7/08

[56] References Cited

U.S. PATENT DOCUMENTS

| | | | |
|---|---|---|---|
| 5,530,759 | 6/1996 | Braudaway et al. | 380/54 |
| 5,568,570 | 10/1996 | Rabbani | 382/238 |
| 5,636,292 | 6/1997 | Rhoads | 382/232 |
| 5,646,997 | 7/1997 | Barton | 380/23 |
| 5,659,726 | 8/1997 | Sandford, II et al. | 395/612 |
| 5,661,574 | 8/1997 | Kawana | 358/501 |
| 5,664,018 | 9/1997 | Leighton | 380/54 |
| 5,907,619 | 5/1999 | Davis | 380/5 |

OTHER PUBLICATIONS

F. Hartung, B. Girod, "Watermarking of MPEG–2 encoded video without decoding and re–encoding", Proceedings SPIE 3020: Multimedia Computing and Networking 97(MMCN 97) Feb. 1997.

F. Hartung, B. Girod, "Digital Watermarking of Raw and Compressed Video", Systems for Video Communication, pp. 205–213, Oct. 1996.

I. Cox, J. Kilian, T. Leighton, T. Shamoon, "Secure Spread Spectrum Watermarking for Multimedia", NEC Research Institute, Technical Report 95–10.

*Primary Examiner*—David E. Harvey
*Attorney, Agent, or Firm*—William J. Burke

[57] ABSTRACT

A method and apparatus for watermarking an image or sequence of images without limiting the watermark signal. The watermarking apparatus includes a conventional DCT unit and quantizer for generating an array of quantized DCT coefficients. The array is watermarked by masking the array to select certain ones of the DCT coefficients that are then replaced by zero values to form a masked array. The masked array is further processed by a watermark inserter that replaces the zero valued coefficients with predefined watermark coefficients to form a watermarked array of DCT coefficients, e.g., a watermarked image. A decoder for decoding the bitstream thusly generated and for removing the embedded watermark is also taught.

13 Claims, 4 Drawing Sheets

QUANTIZED DCT
COEFFICIENTS

SELECTED COEFFICIENTS ARE
REPLACED BY ZEROS

ZEROS ARE REPLACED BY
WATERMARK VALUES

METHOD AND APPARATUS FOR EMBEDDING A WATERMARK INTO A DIGITAL IMAGE OR IMAGE SEQUENCE

The invention relates to image processing systems and, more particularly, the invention relates to a method and apparatus for performing digital watermarking of a digital image or image sequence.

BACKGROUND OF THE DISCLOSURE

With the advent of digitization of images, digital image distribution and digital video availability, copyright protection of such digital imagery has become a substantial issue for image publishers and authors. One technique used to identify digital image ownership is a digital "watermark" that is embedded into an image or image sequence. Such watermarks must be secure, robust to intentional corruption and to compression processing, not unreasonably complex to embed and extract, and compatible and interoperable with conventional image processing systems. The watermark is generally invisible to a viewer. However, in some applications, it is desirable to produce a visible watermark that can be removed by an authorized image decoder and that can not be removed by an unauthorized decoder.

Various digital watermarking techniques have been attempted for both still and video images with varying levels of success. The use of spread-spectrum techniques are disclosed in Hartung et al., "Digital Watermarking of Raw and Compressed Video", Systems for Video Communication, October 1996, pp. 205–213 and Hartung et al., "Watermarking of MPEG-2 Encoded Video Without Decoding and Re-encoding", Proceedings of SPIE 3020, Multimedia Computing and Networking 97 (MMCN 97), February 1997. The first of these papers discloses a technique that spreads the energy of a watermark image throughout a video sequence to be "watermarked" using a pseudo-noise signal. Once the pseudo-noise signal has been embedded into the video sequence, the system encodes the video sequence containing the watermark. In this manner, the watermarking is accomplished in the pixel domain. As such, any coding losses in the video coding process apply to the watermark as well as the images in the video sequence. At the decoder, the spread watermark is correlated and extracted from the video sequence. The use of a spread-spectrum technique requires substantial synchronization and signal processing hardware at both the encoder and decoder to facilitate recovery of the watermark and the video. As such, pixel domain watermark processes are generally avoided.

Both of the aforementioned papers disclose a bitstream domain watermarking technique where the "block" of an image frame within the video sequence is coded and then combined with a coded watermark signal. Specifically, a block is generally an 8×8 pixel portion of an image frame. The block is coded using a discrete cosine transform (DCT) to form a coded block. A watermark image is similarly divided into blocks and DCT coded. The DCT coefficients representing the coded watermark block and the coded image block are then added together to form a combined block. The combined block is quantized and error coded. Thereafter, a selection process is performed to transmit only the "watermarked" coefficients that will not increase the bit rate necessary to transmit the encoded video sequence. This selection process compares the number of bits required to encode coefficients of the combined block with the number of bits required to encode coefficients of the image block only. If the number of combined block bits is greater than the number of image block bits, the system transmits the image block bits; otherwise, the combined block is transmitted. Clearly, such a selection process eliminates some of the watermark information and thus distorts the watermark. In some extreme cases, the watermark information may not be transmitted at all or such a small amount may be transmitted that the watermark is rendered useless.

Therefore, a need exists in the art for a watermarking technique that does not remove any amount of watermark signal to facilitate watermarking a video sequence without exceeding a predefined bit budget.

SUMMARY OF THE INVENTION

The disadvantages associated with the prior art are overcome by the present invention of a method and apparatus for watermarking an image or sequence of images without limiting the watermark signal. The watermarking apparatus includes a conventional DCT unit and quantizer for generating an array of quantized DCT coefficients. The array is watermarked by masking the array to select certain ones of the DCT coefficients that are then replaced by zero values to form a masked array. The masked array is further processed by a watermark inserter that replaces the zero valued coefficients with predefined watermark coefficients to form a watermarked array of DCT coefficients, e.g., a watermarked image. The image that is watermarked is generally divided into a plurality of blocks of pixels, where each block is watermarked in the above manner on a block-by-block basis.

This invention is generally used in a block-based image encoder, such as an MPEG encoder, where the masked array is applied to an embedded decoder such that a predicted image is generated therefrom. The predicted image is compared to the input image to produce a residual image that is watermarked in the manner described above. By having the watermark mask operate within the loop that generates the predicted image, the closed loop encoding will, in essence, compensate for the image distortion that is added to the image by zeroing some of the DCT coefficients. However, since the zeroed coefficients are generally the high frequency coefficients, the distortion is minimal. Depending upon the magnitude of the watermark values and their placement into the DCT array, the watermark can selectively be visible or invisible.

This manner of watermarking an image enables a rather simple technique to be used to remove a visible watermark from the image within an authorized decoder. The authorized decoder must contain a reference watermark that matches the image watermark. If the watermark is generated using a pseudorandom code, the seed to the code can be transmitted within user data in the bitstream. As such, the watermark reference can be produced by the decoder from the seed. Consequently, decoders can selectively be authorized to decode certain image sequences and remove the watermark.

More specifically, a decoder for the bitstream containing the watermark comprises an input processor, a watermark remover/comparator, and a conventional block-based decoder. The input processor processes the input bitstream to extract the header information, the motion vectors, and the arrays (blocks) of DCT coefficients containing the watermark values. Each block, on a block-by-block basis, is coupled to a watermark remover/comparator. The watermark remover/comparator extracts the watermark values and compares them to a reference watermark. If the extracted values match the reference, an authentication signal is generated and the watermark remover/comparator then zeroes the coefficients in the block that contain the watermark values. The block is then decoded in a conventional manner to produce the reconstructed images. However, if the extracted watermark values do not match the reference, the watermark values remain in the block of DCT coefficients and the reconstructed images will be distorted by the visible watermark.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
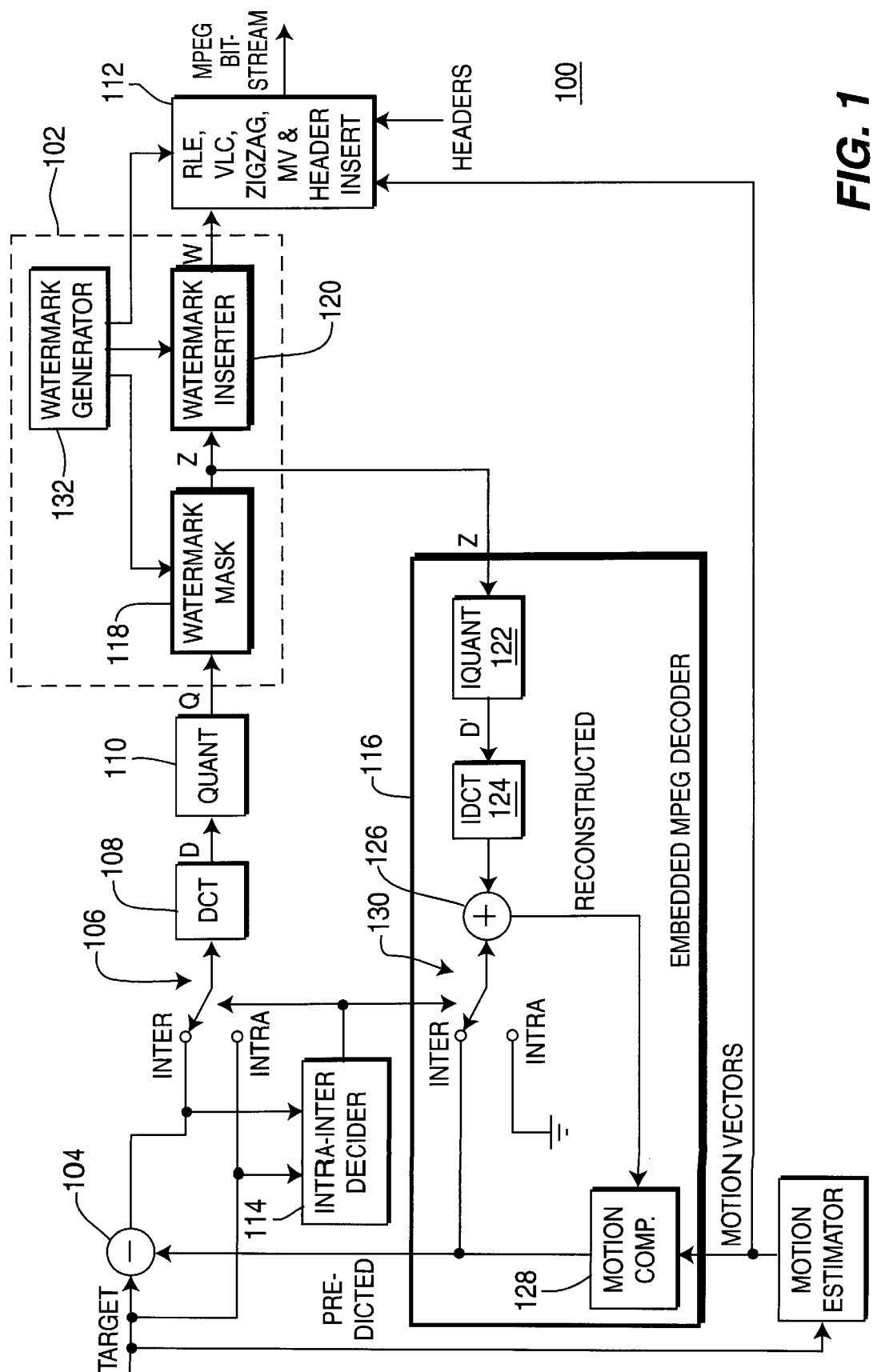
FIG. 1 depicts a block diagram of a block-based video encoder containing digital watermarking apparatus of the present invention.

FIG. 1 depicts a block-based video encoder 100 containing a watermark processor 102. The block-based encoder 100 is illustratively an encoder that satisfies the Moving Pictures Experts Group (MPEG) standards for such encoders of video image sequences, i.e., the encoder is generally referred to as an MPEG encoder. However, the inventive watermarking apparatus should be understood as being applicable to any image or image sequence encoding process that uses DCT coefficients to facilitate the encoding process, e.g., JPEG, H.261, MPEG-1, MPEG-2, and the like.

More specifically, the illustrative MPEG encoder 100 comprises conventional components such as a subtractor 104, a intra-inter switch 106, a DCT unit 108, a quantizer 110, output processor 112, and intra-inter decider 114 and an embedded decoder 116. As is well known, an MPEG encoder operates upon an image frame taken from a sequence of video images. The frame is divided into a plurality of "blocks" that conventionally contain a 16×16 group of pixels. In what is known as a 4:2:0 sampling structure, this block of pixels is processed to form a block of luminance information (e.g., four 8×8 blocks of luminance pixels) and the 16×16 block is subsampled to form two 8×8 blocks of pixels containing chrominance information. The combination of these six blocks of pixel information is known as a "macroblock". However, to maintain generality, the present invention is discussed as processing a target image that should be construed as an array of pixels of any size or shape.

In the illustrative application of the present invention within an MPEG encoder, each 8×8 block of pixel information is applied, one at a time, to the input of the encoder as a "target" image. The target image is compared to a motion compensated predicted image produced by the embedded decoder 116. The comparison is performed in subtractor 104 where image information that is the same in the two images produces a null value and all differences appear as "residuals" within a residual image. The residuals pass through inter-intra switch 106 and are generally transformed into the frequency domain by the DCT unit 108. Specifically, the DCT unit 108 produces an 8×8 array of DCT coefficients representing frequency components of the pixel image information in the 8×8 target block. The DCT coefficients are then quantized by quantizer 110. However, when the intra-inter decider 114 determines that the encoder would more efficiently encode the target image itself rather than the residuals, the intra-inter switch 116 is set to couple the target image directly to the DCT unit 108, i.e., the target image becomes the residual image. A decision to use the target image rather than the residual image generally occurs after a scene change (also known as a scene cut) in the video sequence.

The quantized DCT coefficients are then coupled to the watermark processor 102. The watermark processor 102 comprises a watermark generator 132, a watermark mask 118 and a watermark inserter 120. The watermark mask 118 selects certain ones of the quantized DCT coefficients and sets the value of each selected coefficient to zero. A control signal, produced by the watermark generator, defines the particular coefficients that are to be masked. The masked array of coefficients containing the "zeroed" coefficients is coupled to the embedded decoder 116 and used to produce a predicted image.

The masked block of DCT coefficients is coupled to the watermark inserter 120, where the zeroed coefficients are replaced with watermark coefficients. The watermark coefficients are supplied by the watermark control signal.

The watermarked block of DCT coefficients is then coupled to the output processor that combines the motion vectors and header information with the DCT coefficients and conventionally encodes the assemblage using zig-zag scanning, run-level coding (RLC) and variable length coding (VLC) to form an MPEG compliant bitstream. A control signal is provided to block 112 such certain watermark decoding information can be inserted into, for example, the user data fields of the bitstream. For example, when using a dynamically variable watermark, the synchronization information is inserted into the bitstream to enable a decoder to find and extract the watermark. Also, for pseudo randomly generated watermarks, a seed for decoding the watermark is inserted into the bitstream as, for example, picture layer user data. As such, the watermark related decoding information can be inserted as often as every picture, but need not be.

The masked block of coefficients is coupled to the embedded decoder 116. The embedded decoder 116 comprises an inverse quantizer 122, an inverse DCT unit 124, a summer 126, a inter-intra switch 128, and a motion compensation processor 128. This assemblage of components decodes the previously encoded block and motion compensates the block in a conventional manner. Specifically, the masked block is inverse quantized and inverse DCT processed. As such, a block of reconstructed residuals is formed. These reconstructed residuals are nearly the same as the residuals produced at subtractor 104, but they lack the masked image information. The reconstructed residuals are summed with a predicted image within summer 126 and the summed reconstructed block is motion compensated within motion compensation processor 128 to form a predicted image. The inter-intra switch 130 operates in the same manner as switch 120 as well as also being under the control of the inter-intra decider 114. As such, the predicted image is used to form the reconstructed block and coupled through the switch 130 only when the residuals were originally encoded. Otherwise, the output of the inverse DCT unit is a reconstructed target image that is coupled to the motion compensator without being added to a predicted image.

It is important to note that the watermark mask 118 is within the "loop" that encodes and decodes the target image to form a predicted image, while the watermark inserter 120 is outside of that loop. By placing the watermark mask inside the loop, an authorized MPEG decoder will track the embedded decoder after the watermark is removed.

The watermark inserter 120 is outside the loop to ensure that the watermarked values are "branded" into the bitstream. Note that the watermarked DCT coefficients are modified at the last possible encoding stage and that no further "lossy" processing occurs after the watermark coefficients are inserted into the masked array of DCT coefficients. All the processes that are performed by the output processor are lossless, e.g., zig-zag scanning, VLC and RLC.

Using the watermarking apparatus of the present invention, an unauthorized MPEG decoder will not track the embedded decoder because an unauthorized decoder will not be able to remove the watermark from the decoded block. As such, the output images from an unauthorized decoder will contain periodically fluctuating noise whose visibility is controlled by the value of the watermarked coefficients. A decoder that can be used to remove a watermark embedded in the manner discussed above, is disclosed with respect to FIG. 5 below.

Figure 2:
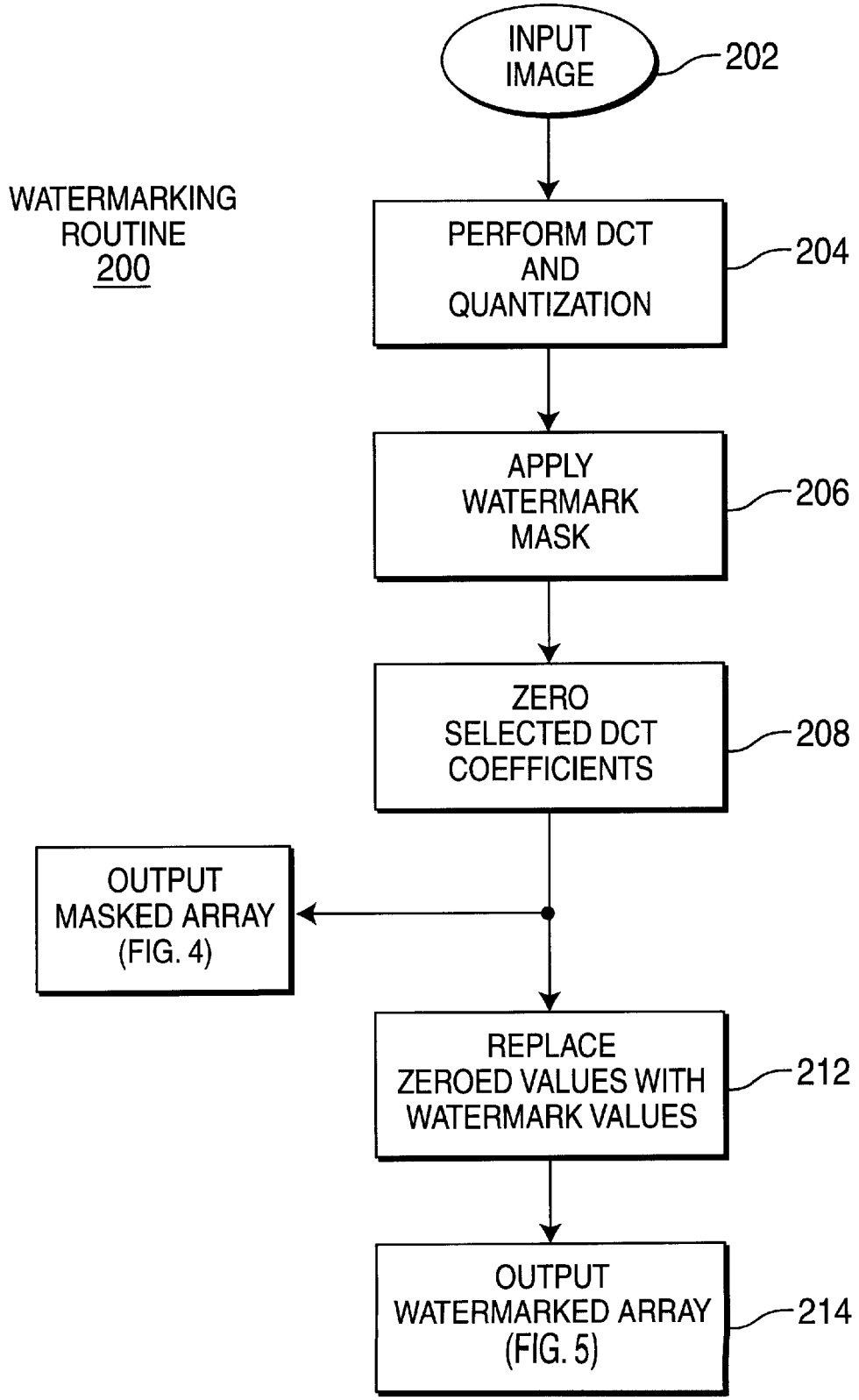
FIG. 2 depicts a flow diagram of a watermarking routine in accordance with the present invention.
Figure 3:
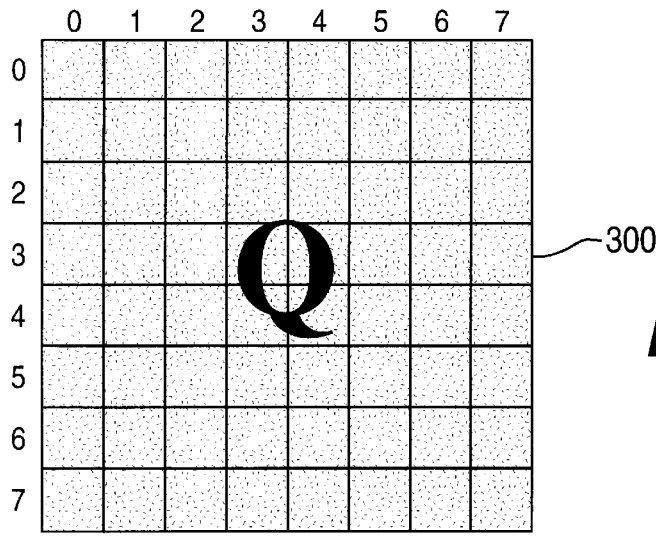
FIG. 3 depicts an illustrative block of quantized DCT coefficients.
Figure 4:
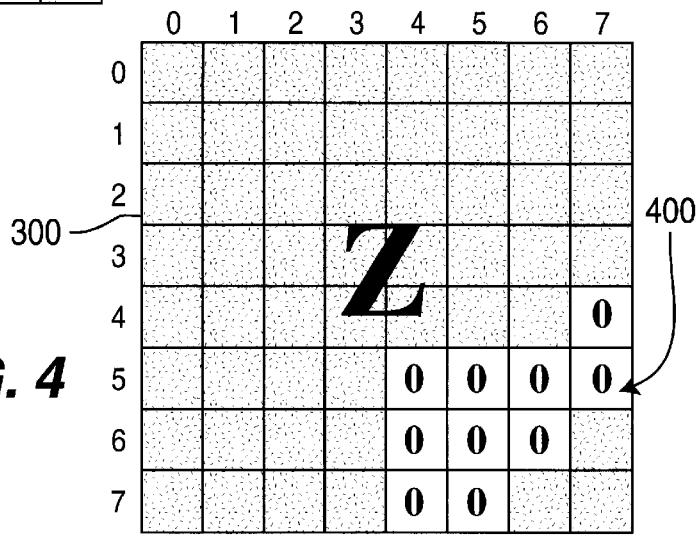
FIG. 4 depicts the block of FIG. 2 with a watermark mask applied thereto.
Figure 5:
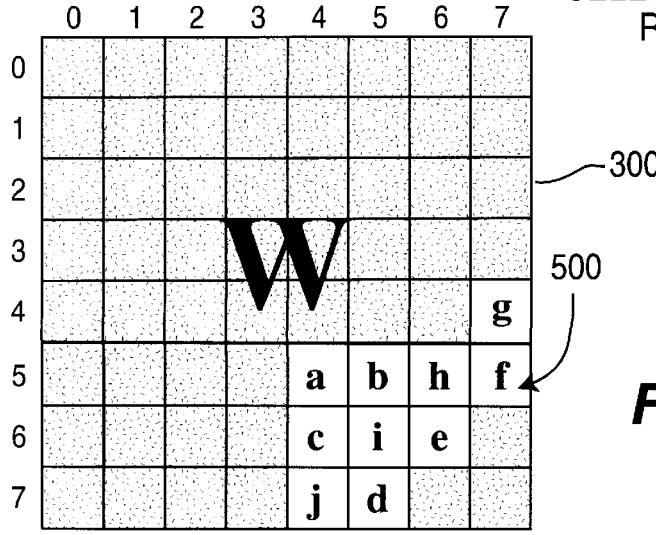
FIG. 5 depicts the block of FIG. 3 having the "masked" DCT coefficients replaced with watermark coefficients.

FIG. 2 depicts a block diagram of the process used to embed the watermark into an image and FIGS. 3, 4, and 5 graphically depict the array of DCT coefficients as it is processed by the present invention. To best understand the invention the reader should simultaneously refer to FIGS. 2, 3, 4, and 5.

Specifically, the method of the present invention (watermarking routine 200) begins, at step 202, with an input image (e.g., the residual image). At step 204, the input image is converted to the frequency domain using a discrete cosine transformation of the image content and then quantizing the DCT coefficients. FIG. 3 graphically depicts an 8×8 block or array 300 of quantized DCT coefficients. The watermark mask is applied at step 206 to select certain ones of the DCT coefficients. At step 208, the selected coefficients are "zeroed", i.e., assigned a zero value. FIG. 4 graphically depicts the block 300 of FIG. 2 after having a watermarking mask applied to the block and the selected DCT coefficients 400 set to a zero value. At step 210, the routine produces the masked array as an output. As described above, in an MPEG decoder application, the masked array can be used by an embedded encoder to produce a predicted image.

At step 212, the routine 200 replaces the selectively zeroed coefficients with watermark values (i.e., quantized DCT coefficients derived from a watermark image). Care must be taken in selecting DCT coefficients for replacement. If the watermark is to have low visibility, then it is critical that relatively small watermark DCT values, e.g., −1, 0, +1, be inserted into the locations carrying the highest frequency coefficients of the DCT. Such highest frequency locations are generally in the lower right hand corner of the DCT block. Masking these coefficients will cause a low-level "cheesecloth"-like appearance in the reconstructed values. However, such an effect does not generally produce visible artifacts in the decoded image sequence. To further reduce the visibility of the cheesecloth effect, the watermark DCT values that are inserted can be reversed in polarity in co-sited macroblocks from frame-to-frame. As such, the average luminance deviation is zero and therefore less visible. If the watermark is to have high visibility, large watermark DCT values should be used. FIG. 5 graphically depicts the array 300 after watermark DCT coefficients 500 have been inserted into the masked locations in the array. At step 214, the routine outputs the watermarked array of DCT coefficients.

The replaced DCT coefficients will affect the bit count associated with each block in the picture, i.e., each block in a picture that is encoded is allocated a certain number of bits that are used to encode the block and the addition of the watermark values will generally increase that bit count. In some cases, the addition of a watermark, may decrease the bit count, but in most cases (i.e., where the high frequency DCT coefficients would have otherwise been zero values), the bit count will be increased. However, careful selection of the watermark coefficients can minimize the additional bit count. For example, it is more efficient to code coefficients with magnitude 0 or 1 than it is to code values with greater magnitude. Thus, low magnitudes should be used as watermark coefficients. Additionally, the rate control technique (i.e., the algorithm that actually controls the coding rate and quantization scale for the DCT coefficients) can be modified on either a local or global basis to account for the slight increase in bit rate that adding watermark coefficients will require.

The actual watermark values may be deterministically, pseudo-randomly or cryptographically generated within the watermark generator (132 of FIG. 1). For instance, the generator 132 converts a trademark (e.g., XYZ) or some other identifying word or image into a binary (ASCII) equivalent. The binary values, for example, are then used to replace the quantized coefficient Q(7,7) of FIG. 2 with a 1 or 0 in successive blocks that are processed by the encoder. In this manner, only one coefficient in each array of coefficients is replaced.

Alternatively, a pseudo-random sequence generator could generate a pseudo-random value, normalize the value and replace Q(7,7) with a 0 whenever the normalized value is in the range 0 to 0.5, and replace Q(7,7) with 1 whenever the normalized value is in the range 0.5 to 1. The type of watermark that is used (deterministic or pseudo-random) can be transmitted to the receiving decoder using the user data field within the MPEG transport stream. When using a pseudo-randomly generated code, the user data can also be used to transmit a "seed" for the pseudo-random code such that the decoder can easily extract the watermark. Using the user data in this manner, allows the encoder that inserts the watermark to change the watermark code while still allowing the authorized decoder to automatically remove the new watermark.

Once the watermark is inserted into an image in the manner described above, an unauthorized decoder (e.g., standard MPEG) processes the watermark as if it were the coded image. Depending upon the watermark coefficients, the watermark will either be visible or invisible in the decoded images. In some cases, it is desirable to have a highly visible watermark that appears in any images that were decoded using an unauthorized decoder. However, such a visible watermark would require removal from images decoded by an authorized decoder.

Figure 6:
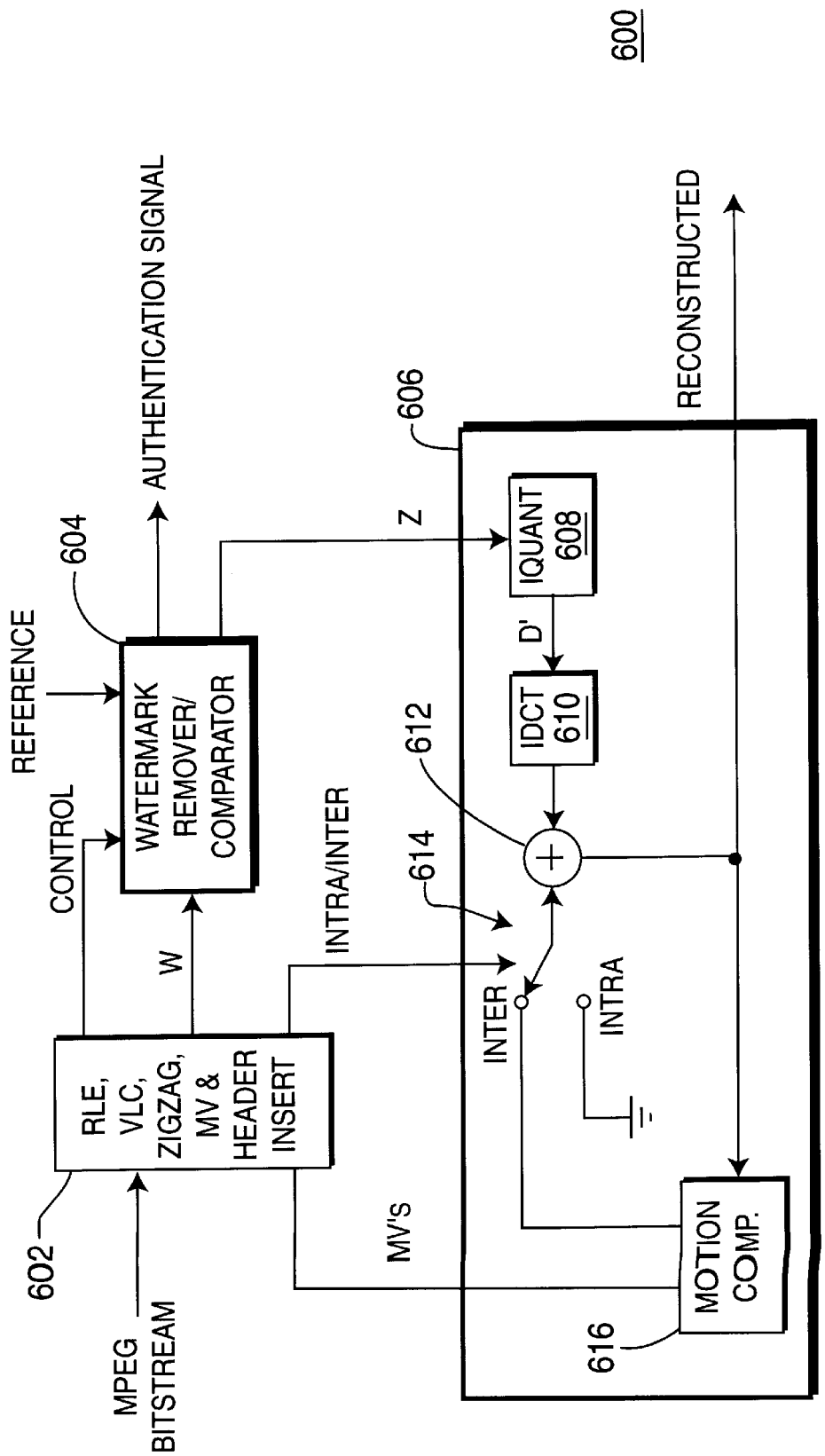
FIG. 6 depicts a block-based video decoder containing a watermark removing apparatus of the present invention.

FIG. 6 depicts a block diagram of a block-based image decoder (e.g., an MPEG decoder) for decoding a bitstream generated by the encoder of FIG. 1 and simultaneously removing a watermark from the decoded image sequence. The decoder 600 comprises an input processor 602, a watermark remover/comparator 604, and a conventional decoder 606. The input processor 602 processes the MPEG-compliant bitstream by variable length decoding, run-length decoding, inverse zig-zag scanning, and removing the header to produce a block (array) of quantized DCT coefficients containing watermark information. The picture layer user data contains information regarding the manner in which the DCT block has been modified to include the watermark, i.e., the information details which locations contain watermark data. From the user data, the input processor 602 produces a control signal that is coupled to the watermark remover/comparator 604. This control signal provides the locations of the coefficients that carry the watermark values. To verify the authenticity of the watermark, the watermark remover/comparator extracts the watermark values from the block and the extracted watermark coefficients are compared against a stored reference (or a reference that is pseudo-randomly generated from a seed transmitted from the encoder to the decoder). If a match occurs, the authenticity of the watermark is confirmed and an authentication signal is produced. If no match is found, then the watermark was not inserted by an authorized encoder. If a match occurs, the watermark remover/comparator then "zeroes" the watermark value in each of those locations to produce the block Z (also depicted in FIG. 4). However, without a match, the watermark remover/comparator will not zero the watermark values and, as such, any reconstructed images will be distorted by the watermark values.

To complete decoding of the bitstream, the MPEG decoder 606 comprises an inverse quantizer 608, an inverse DCT unit 610, a summer 612, a inter-intra switch 614 and a motion compensator 616. The motion vectors and the intra/inter decisions associated with each block are extracted from the bitstream by the input processor 602 and coupled to the MPEG decoder 606. The inverse quantizer 606 and inverse DCT unit 610 operate upon block Z to inverse quantize and inverse DCT process the block to form a block of pixels. The summer 612 sums the pixels with a predicted block of pixels to form a reconstructed image. If the block was intra-coded in the encoder, then a predicted block is not applied to the summer 612, i.e., the switch 614 is switched to the intra terminal which is grounded. The reconstructed image is produced at the decoder output and also coupled to the motion compensator to be motion compensated to form a predicted block.

Although various embodiments which incorporate the teachings of the present invention have been shown and described in detail herein, those skilled in the art can readily devise many other varied embodiments that still incorporate these teachings.

What is claimed is:

1. An image encoder for inserting a watermark into an image containing a plurality of pixels, where the pixels are encoded using discrete cosine transform (DCT) coefficients, comprising:
    a watermark mask for masking an array of DCT coefficients representing said image and setting select ones of said DCT coefficients in said array to a zero value; and
    a watermark inserter, coupled to said watermark mask, for inserting watermark values into locations in said DCT coefficient array where said DCT coefficients were masked and set to a zero value.

2. The apparatus of claim 1 further comprising a watermark generator for producing said watermark coefficients as quantized DCT coefficients of a predefined character string.

3. The apparatus of claim 1 further comprising a watermark generator for producing said watermark values are pseudo-randomly generated.

4. A DCT based image encoder for inserting a watermark into an image containing a plurality of pixels, where the pixels are encoded using discrete cosine transform (DCT) coefficients, comprising:
    a watermark mask for selecting certain ones of said DCT coefficients representing said image and changing the value of the selected DCT coefficients to zero to form a masked array of DCT coefficients;
    an image decoder, coupled to said watermark mask, for generating a predicted image from said masked array of DCT coefficients;
    a watermark inserter, coupled to said watermark mask, for replacing the selected DCT coefficients with watermark values to produce a watermarked array of DCT coefficients;
    an output processor, coupled to said watermark inserter, for losslessly coding said watermarked array of DCT coefficients to form a bitstream.

5. The apparatus of claim 4 further comprising a watermark generator for producing said watermark coefficients as quantized DCT coefficients of a predefined character string.

6. The apparatus of claim 4 further comprising a watermark generator for producing said watermark values are pseudo-randomly generated.

7. The apparatus of claim 6 wherein said watermark generator is coupled to said output processor and supplies said output processor with certain information useful in decoding said watermark values, where the output processor inserts the certain information into said bitstream.

8. The apparatus of claim 7 wherein said certain information is a seed for decoding said pseudo-randomly generated watermark values.

9. A method of inserting a watermark into an image containing a plurality of pixels, where the pixels are encoded using discrete cosine transform (DCT) coefficients, comprising the steps of:
    masking an array of DCT coefficients representing said image and setting select ones of said DCT coefficients in said array to a zero value; and
    inserting watermark values into locations in said DCT coefficient array where said DCT coefficients were masked and set to a zero value.

10. A method of extracting a watermark from a bitstream comprising the steps of:
    extracting, from the bitstream, DCT coefficients that contain watermark values;
    comparing the watermark values to reference watermark values;
    producing an authentication signal if the watermark values match the reference watermark values;
    if said authentication signal is produced, setting said watermark values in said DCT coefficients of said bitstream to zero to remove the watermark from the DCT coefficients in the bitstream, whereby an image is decoded without the appearance of a watermark.

11. The method of claim 10 further comprising the step of recalling said reference watermark values from memory.

12. The method of claim 10 further comprising the step of:
    decoding information within said bitstream to produce said reference watermark values.

13. The method of claim 12 wherein said information is a seed for a pseudorandom code that forms the basis for the reference watermark values.

* * * * *